United States Patent [19]

Van Bruwaene et al.

[11] Patent Number: 4,600,338
[45] Date of Patent: Jul. 15, 1986

[54] MUD REMOVAL PROCESS AND APPARATUS

[75] Inventors: Albert Van Bruwaene, Lennik; Luc Neyrinck, Edegem; Luc Maertens, Louvain; Bo Verner, Antwerp; Staffan Fors, Wilrijk, all of Belgium

[73] Assignees: De Ondernemingen S.B.B.M.; N.V. Atlas Copco Airpower Corp., both of Brussels, Belgium

[21] Appl. No.: 511,329

[22] Filed: Jul. 6, 1983

[30] Foreign Application Priority Data

Jul. 8, 1982 [BE] Belgium ............................ 208552

[51] Int. Cl.$^4$ .............................................. E02B 3/02
[52] U.S. Cl. ............................................ 405/74; 37/58; 37/195
[58] Field of Search .................. 37/58, 61–63, 37/54, 59, 195; 405/73, 74

[56] References Cited

U.S. PATENT DOCUMENTS

| | | | |
|---|---|---|---|
| 1,180,664 | 4/1916 | Littlehales | 37/62 |
| 1,461,240 | 7/1923 | Godfrey | 37/61 |
| 3,565,491 | 2/1971 | Frazier | 37/58 X |
| 3,638,432 | 2/1972 | Schoonmaker | 37/58 X |
| 3,753,303 | 8/1973 | Holzenberger et al. | 37/58 |
| 3,842,521 | 10/1974 | Faldi | 37/59 X |
| 3,909,960 | 10/1975 | Casciano | 37/63 |
| 4,147,450 | 4/1979 | Schoonmaker | 37/61 X |
| 4,189,253 | 2/1980 | Pekor | 37/61 X |

Primary Examiner—Clifford D. Crowder
Attorney, Agent, or Firm—Austin R. Miller

[57] ABSTRACT

A process and a stationary dredging apparatus for periodically removing marine or river sediment of relatively high density from the bottom of an arm of the sea, a channel or a harbor basin by means of a stationary dredging means consisting of a substantially horizontal intake duct, which may be positioned at the bottom of a mud trap, an individual riser pipe operating either on the principle of an air-lift pump, or by aspiration of a mechanical pump, optionally according to a preestablished programme by regulating the air-arrival or the opening of the valves of the riser pipes, and a delivery pipe.

2 Claims, 3 Drawing Figures

MUD REMOVAL PROCESS AND APPARATUS

BACKGROUND OF THE INVENTION

This invention relates to a process for removing marine or river sediment, deposited on the bottom of a stretch of water, at a certain distance from a bank or quay wall, by means of a stationary dredging means.

It relates in particular to a process for removing sediment from a tidal arm of the sea, a channel or a harbour basin by way of a stationary dredging plant provided with drive means for raising a mixture of sediment and water.

It also relates to the equipment required to carry out the above process successfully.

The process and apparatus according to the invention are intended primarily for permanently removing the layer of mud of relatively high density so as to maintain a sufficient draught for shipping.

It is a known fact that the presence of mud deposits in the navigable waters of a harbour or estuary results in a reduction in the draught of the shipping.

In the main, mud banks with a density higher than 1.2 tons per cubic meter make it very difficult to pilot the ships passing through them.

PRIOR ART

Maintenance dredging work has hitherto been carried out by means of suction hopper dredges which suck in the mud by way of a draghead as they travel through the zones in which a layer of mud is to be removed.

Most of the time, the mud has to be dumped at sea, a certain distancwe away, or pumped towards a reclamation area.

This known method is expensive since the dredging equipment involves high capital expenditure, requires considerable manpower and consumes a great deal of energy, chiefly for the propulsion of the vessel.

A process and apparatus for preventing silting are known from British Patent Specification No. 1492624.

This apparatus comprises an air-lift pump provided with suction ducts underneath.

This apparatus is used for removing mud in the immediate vicinity of a wharf or a quay wall on which the riser pipe is fixed.

However, this system is not suitable for removing sediment from navigable waters or channels which are further away from a harbour wall or other point of support.

The aim of the present invention is to remedy this fact in certain circumstances.

SUMMARY OF THE INVENTION

The invention relates to a process for removing marine or river sediment, deposited on the bottom of a stretch of water, at a certain distance from a bank or quay wall, by way of a stationary dredging means, characterized in that a mixture of sediment and water is sucked in, through the mouthpiece of at least one substantially horizontal intake duct connected to an individual riser pipe, by the vacuum created either by the principle of an air-lift pump or a mechanical pump, this mixture then being discharged through said riser pipe and through a delivery pipe to a bank or to a reservoir from which the above-mentioned mixture of sediment and water may be pumped away into the sea or a deposit on land.

The mutual distance between the intake mouthpieces of a number of said intake ducts is conveniently chosen as a function of the flow properties of the mud which is kept permanently moving slightly at the bottom of the water.

According to one feature of the invention, suction is periodically created in the intake duct by injecting air into the above mentioned riser pipe for an interval of time which is determined as a function of the quantity of sediment and the physical properties thereof.

In a particular embodiment, a series of suction pipes is used, comprising mouthpieces distributed over the bottom of a stretch of water connected to riser pipes, wherein compressed air produced by at least one compressor is injected successively into each riser pipe or group of riser pipes of the dredging means, so as to make each suction pipe or group of suction pipes operate in turn. With a mechanical pump, the same effect is obtained by opening or closing the valves mounted on the upper end of the riser pipes.

The invention also relates to a fixed dredging apparatus for carrying out the process described above. One characteristic of this fixed apparatus consists in the fact that the above mentioned intake duct or ducts may be arranged on the bottom of a mud or sediment trap, the mouthpieces of said ducts being distributed over the entire expanse of the said trap.

In a particular embodiment the apparatus comprises a bundle of said intake ducts arranged parallel to one another at the bottom of the navigable waters, these ducts being of different lengths. The intake ducts are preferably anchored to the bottom by means of ballast.

DETAILED DESCRIPTION OF THE PREFERRED EMBODIMENTS

Figure 1:
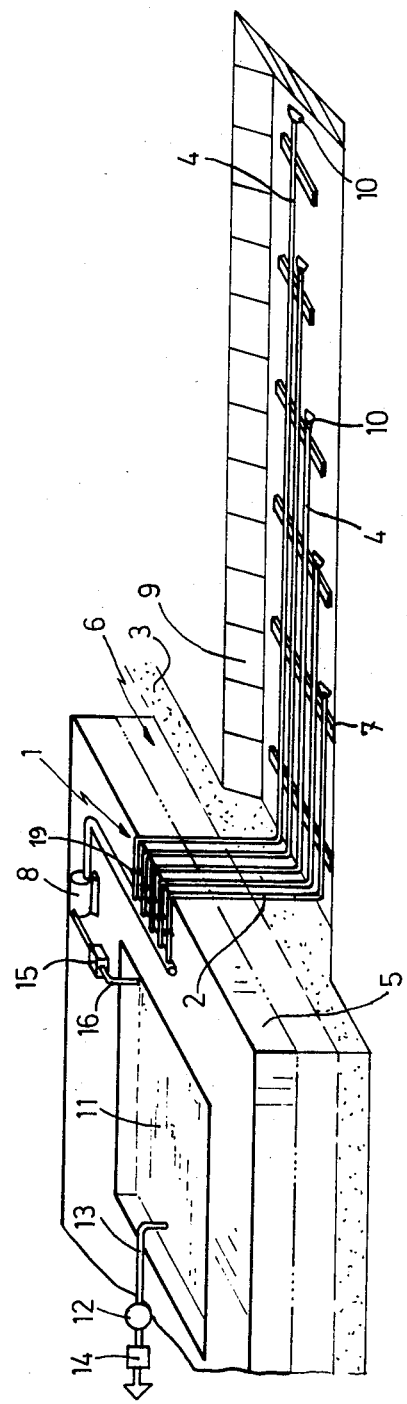
FIG. 1 is a perspective view of a stationary dredging apparatus according to the invention for removing mud, the riser pipes being fixed to the facing of a quay wall and with a mechanical pump.
Figure 2:
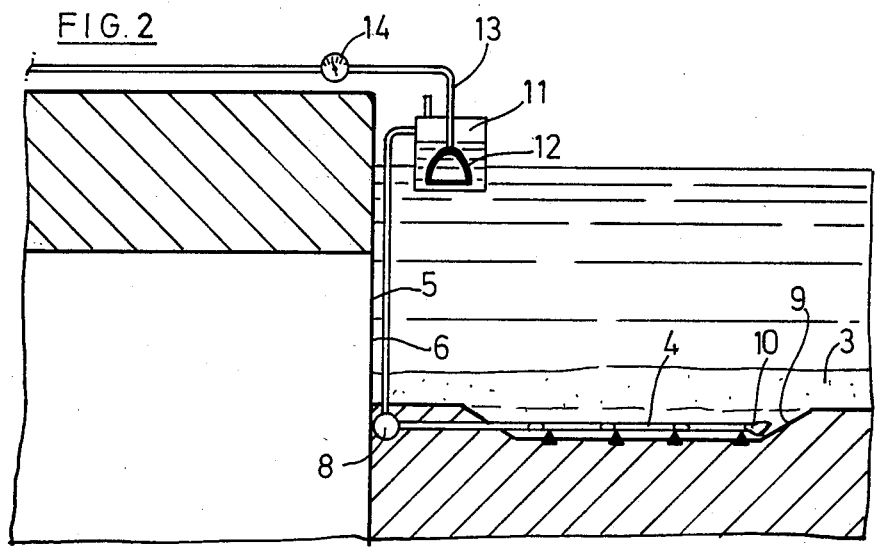
FIG. 2 is a section, on a larger scale, of the apparatus illustrated in FIG. 1, wherein the mixture is pumped from a floating reservoir by means of submerged pumps.

A first embodiment of the fixed installation, designated as a whole by reference numeral 1, for removing mud according to the invention, is shown in FIGS. 1 and 2.

It has at least one riser pipe 2, which is substantially vertical, and an intake duct 4, which is disposed in the layer 3 of an estuary zone and is fixed to the facing 5 of a quay wall 6, wharf or other fixed point such as a stake or caisson.

The intake duct 4 is optionally disposed on the bottom of a mud trap 9 below the surface of the water. FIG. 1 shows an embodiment wherein the various intake ducts are arranged parallel to one another on the bottom of the mud trap 9. The aspiration is obtained by means of a mechanical pump 8.

These intake ducts 4 are of various lengths, so that the ends of these ducts 4 are evenly distributed over the zone which is to be dredged.

Advantageously, each duct 4 is provided with an intake mouthpiece 10 at its end.

The mutual spacing between two successive mouthpieces 10 is judiciously chosen to ensure permanent movement of the mud by suction and gravity.

As a result, it is possible to remove the mud under water over a very large surface area.

The dimensions and gradients of the mud trap 9 are determined as a function of the properties of the mud and the quantities which are to be removed. In fact, it has been found that slow movement of the mud prevents it from becoming compacted. The same effect may be achieved by agitation with mechanical means or by air and/or water jetting. The results of a number of experiments have shown that, most of the time, the mud deposited at the bottom of the bed is in a state of low rigidity immediately after being deposited. This means that the mud has little coherence and will readily flow into the mouthpiece of the intake duct.

This state is promoted by the force of the current and the waves in the water passing over it.

The rigidity of the mud depends on the chemical composition and particle size of the mud.

By a judicious choice of diameter for the intake ducts 4 and riser pipes 2, it is possible to suck up sand and other materials.

In the embodiment of the invention shown in FIG. 2, the mud is forced through the suction pipe, by the principle of an air-lift pump, into the riser pipes 2 towards a reservoir 11 from which it is pumped by a fixed mechanical submerged booster pump 12 through ducts 13 fitted with a flow-meter 14.

The apparatus according to the invention results in a substantial saving in the operation of maintaining a sufficient depth in a waterway. It does not require any floating equipment. The fixed installation may be constructed simply and operated automatically. It may operate continuously throughout the day or for a period of time only.

The quantity of mud removed is measured by means of an apparatus 15 for measuring the concentration and flow rate in the discharge duct 16.

Figure 3:
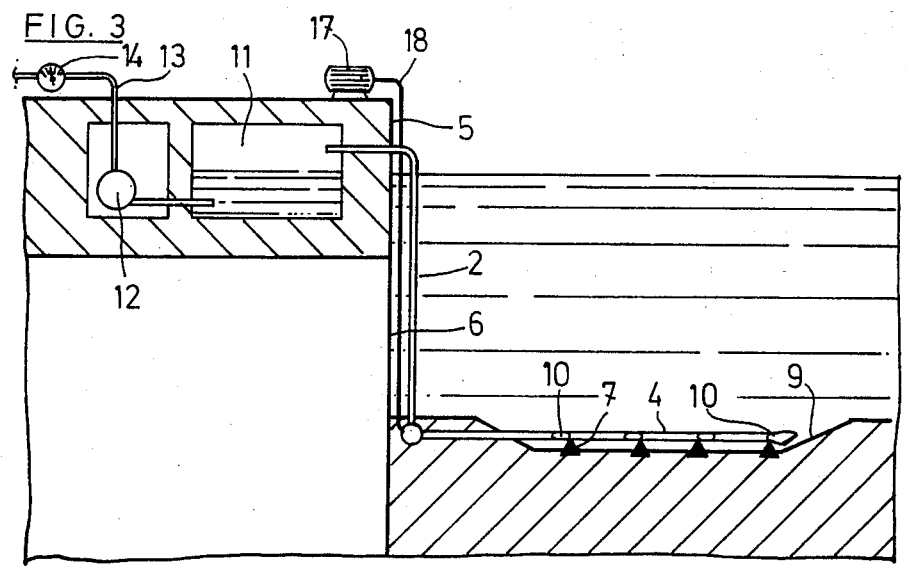
FIG. 3 is a vertical section through an apparatus wherein the mud is transported from a large reservoir by means of a booster pump and ducts.

In case the known principle of the air-lift pump is used, the compressed air from a compressor 17 is brought into contact successively, in a programmed sequence, with various riser pipes via the pressurised duct 18 (see FIG. 3).

The operating cycle and flow through the intake ducts are determined as a function of the quantities and characteristics of the mud so as to maintain a constant movement towards the mud trap and prevent excessive compaction or dilution.

A pump is stopped when the water content of the mud exceeds a certain limit. Then, other intake mouthpieces can be put into operation, by opening of the valves 19 according to a preestablished programme.

The invention may be used for removing mud from channels leading to harbours, at man-made structures such as locks and dry docks, and in harbour basins.

The invention is by no means limited to the specific embodiments, which are described purely by way of example, since anyone skilled in the art can make numerous modifications without going beyond the scope of the inventive concepts herein. The invention, therefore, is not to be restricted except in the spirit of the appended claims.

What is claimed is:

1. Stationary dredging apparatus for removing sediment from the bottom of a stretch of water at a distance from a bank bounding the water without introduction or use of auxiliary water, comprising, in combination:
    (a) a plurality of generally horizontal parallel suction pipes spaced apart over the bottom of the stretch of water from which said sediment is to be removed and extending laterally from said bank, each pipe having a single intake duct located at an end of said pipe remote said bank, said pipes being closed between said intake ducts and said bank;
    (b) a plurality of parallel substantially vertical riser pipes disposed along said bank, each pipe of said plurality being connected to a respective one of said horizontal suction pipes, for upward transfer of said sediment received from said respective horizontal suction pipe;
    (c) a suction pump on said bank above said water for drawing sediment through said vertical riser pipes and said horizontal suction pipes from said intake ducts and discharging said sediment on said bank after passage through said pump;
    (d) a plurality of programmably operated shut-off valves located on said bank above said water for sequentially selectably connecting individual ones of said vertical riser pipes with said suction pump to apply maximum pump suction to said connected pipe;
    (e) an air compressor;
    (f) vertical conduits disposed along said bank for transporting compressed air from said air compressor for injection through a lateral wall into interior juncture of respective horizontal suction pipes and vertical riser pipes below water level, said conduits freely communicating with said interior of respective horizontal suction and vertical riser pipes at juncture thereof, so that said injected compressed air rising in said riser pipe assists upward conveyance of said sediment;
wherein when a selected one of said shut-off valves is open said suction pipe draws sediment through a respective vertical riser pipe-horizontal suction pipe combination from a respective intake duct with compressed air injected at said horizontal suction pipe-vertical riser pipe juncture interior rising in said riser pipe and aiding in upward conveyance of said sediment but when said selected one of said shut-off valves is closed said suction pump is isolated from said respective vertical riser pipe-horizontal suction pipe combination with said compressed air injected at said horizontal suction pipe-vertical riser pipe juncture interior flowing through said horizontal suction pipe and out of a respective intake duct, oppositely to the direction of flow of sediment therethrough when said suction pump is connected thereto, to clean the suction pipe and the inlet duct thereof of accumulated sediment.

2. A process for removing sediment from the bottom of a stretch of water without utilizing auxiliary water comprising the steps of:
    (a) sequentially sucking sediment through a pump and a respective one of a plurality of stationary horizontally disposed suction pipes of varying lengths spaced apart and extending laterally outwardly from the water bank over the bottom of the stretch of water from which said sediment is to be removed by applying a suction from said pump at one end of a stationary vertically oriented riser pipe connected to a respective horizontally disposed suction pipe below water level, close to the bottom, and extending vertically therefrom proximate said water bank to a position above water level, thereby to draw said sediment through said horizontal suction pipe via a single inlet duct at the remaining end of said horizontal suction pipe remote said water bank, by sequentially connecting said ends of said respective vertically oriented riser pipes to said suction pump located on the bank above water level;

(b) blocking ends of remaining ones of said plurality of vertically oriented riser pipes via which said suction is applied by closing respective valves disposed within said riser pipes above said water level;

(c) injecting compressed air into remaining pipes of said plurality of connected vertically oriented riser pipes and horizontally oriented suction pipes at juncture thereof while said ends of said riser pipes via which suction is applied are blocked due to closure of said valves, thereby forcing compressed air through said horizontal suction pipe in direction opposite to the direction of sediment flow therethrough, to clean the suction pipe and the inlet duct thereof of accumulated sediment;

(d) opening said valve associated with said vertically oriented riser pipe-horizontally oriented suction pipe combination into which said air is injected;

(e) sucking sediment through said vertically oriented riser pipe-horizontally oriented suction pipe combination, while continuing to inject compressed air thereinto at juncture thereof, by applying suction at said end of said vertically oriented riser pipe extending above water level proximate said water bank thereby to draw said sediment into said inlet duct of said horizontal suction pipe of said vertically oriented riser pipe-horizontal suction pipe combination and through said horizontal suction and vertical riser pipes of said combination with said injected air rising in said riser pipe and thereby assisting upward conveyance of said sediment therethrough to said pump;

(f) repeating steps (b), (c), (d) and (e) until all of said plurality of horizontally disposed suction pipe-vertically oriented riser pipe combinations have been used to remove a desired amount of sediment from the bottom of said stretch of water.

\* \* \* \* \*